(12) United States Patent
Yerushalmy et al.

(10) Patent No.: US 11,861,944 B1
(45) Date of Patent: Jan. 2, 2024

(54) SYSTEM FOR SYNCHRONIZING VIDEO OUTPUT BASED ON DETECTED BEHAVIOR

(71) Applicant: AMAZON TECHNOLOGIES, INC., Seattle, WA (US)

(72) Inventors: Ido Yerushalmy, Tel-Aviv (IL); Ianir Ideses, Raanana (IL); Eli Alshan, Kfar-Saba (IL); Mark Kliger, Mod'in (IL); Liza Potikha, Netanya (IL); Dotan Kaufman, Netanya (IL); Sharon Alpert, Rehovot (IL); Eduard Oks, Redmond, WA (US); Noam Sorek, Herzliya (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/582,789

(22) Filed: Sep. 25, 2019

(51) Int. Cl.
*H04N 5/04* (2006.01)
*G06V 40/20* (2022.01)
*G06V 20/40* (2022.01)

(52) U.S. Cl.
CPC .............. *G06V 40/23* (2022.01); *G06V 20/40* (2022.01); *H04N 5/04* (2013.01)

(58) Field of Classification Search
CPC ........... G06K 9/00342; G06K 9/00711; G06K 9/00335; G06F 16/70; G11B 27/28; H04N 5/04; H04N 7/56
See application file for complete search history.

(56) References Cited

U.S. PATENT DOCUMENTS

| 10,535,146 | B1 * | 1/2020 | Buibas | G06K 9/6271 |
|---|---|---|---|---|
| 2009/0077504 | A1 * | 3/2009 | Bell | G06F 3/04812 715/863 |
| 2013/0278501 | A1 * | 10/2013 | Bulzacki | G06F 3/0304 345/157 |
| 2021/0001172 | A1 * | 1/2021 | Namboodiri | A63B 24/0062 |

FOREIGN PATENT DOCUMENTS

WO   WO-2019130527 A1 *  7/2019   ......... G06K 9/00214

OTHER PUBLICATIONS

Bogo, et al., "Keep it SMPL: Automatic Estimation of 3D Human Pose and Shape from a Single Image", Max Plank Institute for Intelligent Systems, Tubingen, Germany, 18 pages. Retrieved from the Internet: URL: https://arxiv.org/abs/1607.08128.

(Continued)

*Primary Examiner* — Thai Q Tran
*Assistant Examiner* — Jose M Mesa
(74) *Attorney, Agent, or Firm* — Lindauer Law, PLLC

(57) ABSTRACT

Video output is generated based on first video data that depicts the user performing an activity. Poses of the user during performance of the activity are compared with second video data that depicts an instructor performing the activity. Corresponding poses of the user's body and the instructor's body may be determined through comparison of the first and second video data. The video data is used to determine the rate of motion of the user and to generate video output in which a visual representation of the instructor moves at a rate similar to the that of the user. For example, video output generated based on an instructional fitness video may be synchronized so that movement of the presented instructor matches the rate of movement of the user performing an exercise, improving user comprehension and performance.

22 Claims, 6 Drawing Sheets

(56) References Cited

OTHER PUBLICATIONS

Cao, et al., "Realtime Multi-Person 2D Pose Estimation using Part Affinity Fields", The Robotics Institute, Carnegie Mellon University, 9 pages. Retrieved from the Internet: URL: https://arxiv.org/abs/1611.08050.

Carreira, et al., "Quo Vadis, Action Recognition? A New Model and the Kinetics Dataset", DeepMind, Department of Engineering Science, University of Oxford, 10 pages. Retrieved from the Internet: URL: https://arxiv.org/abs/1705.07750.

Chan, et al., "Efficient Time Series Matching by Wavelets", Department of Computer Science and Engineering, The Chinese University of Hong Kong, 8 pages. Retrieved from the Internet: URL: https://infolab.usc.edu/csci599/Fall2003/Time%20Series/Efficient%20Time%20Series%20Matching%20by%20Wavelets.pdf.

Chen, et al., "View Interpolation for Image Synthesis", Apple Computer, Inc., ACM 1993, pp. 279-288. Retrieved from the Internet: URL: https://cseweb.ucsd.edu/~ravir/6998/papers/p279-chen.pdf.

Daubechies, Ingrid, "The Wavelet Transform, Time-Frequency Localization and Signal Analysis", IEEE Transactions on Information Theory, vol. 36, No. 5, Sep. 1990, pp. 961-1005. Retrieved from the Internet: URL: https://www.semanticscholar.org/paper/The-wavelet-transform%2C-time-frequency-localization-Daubechies/2384a683444b8fc03774d5af6791d81f6c48b6b2.

Drover, et al., "Can 3D Pose be Learned from 2D Projections Alone?", Amazon Lab126 Inc., Sunnyvale, CA., USA, 17 pages. Retrieved from the Internet: URL: https://arxiv.org/abs/1808.07182.

Girshick, Ross, "Fast R-CNN", Microsoft Research, 9 pages. Retrieved from the Internet: URL: https://arxiv.org/abs/1504.08083.

He, et al., "Mask R-CNN", Facebook AI Research, 12 pages. Retrieved from the Internet: URL: https://arxiv.org/abs/1703.06870.

Lin, et al. "Feature Pyramid Networks for Object Detection", Facebook AI Research, 10 pages. Retrieved from the Internet: URL: https://arxiv.org/abs/1612.03144.

Liu, et al. "SSD Single Shot MultiBox Detector", UNC Chapel Hill, 17 pages. Retrieved from the Internet: URL: https://arxiv.org/abs/1512.02325.

Martinez, et al., "A Simple Yet Effective Baseline for 3D Human Pose Estimation", University of British Columbia, Vancouver, Canada, 10 pages. Retrieved from the Internet: URL: https://arxiv.org/abs/1705.03098.

Newell, et al., "Stacked Hourglass Networks for Human Pose Estimation", University of Michigan, Ann Arbor, 17 pages. Retrieved from the Internet: URL: https://arxiv.org/abs/1603.06937.

Ng, et al., "Beyond Short Snippets: Deep Networks for Video Classification", University of Maryland, College Park, 9 pages. Retrieved from the Internet: URL: https://arxiv.org/abs/1503.08909.

Pavlakos, et al., "Expressive Body Capture: 3D Hands, Face, and Body from a Single Image", MPI for Intelligent Systems, Tubingen, DE, 22 pages. Retrieved from the Internet: URL: https://arxiv.org/abs/1904.05866.

Pavlakos, et al., "Ordinal Depth Supervision for 3D Human Post Estimation", University of Pennsylvania, 10 pages. Retrieved from the Internet: URL: https://arxiv.org/abs/1805.04095.

Pavllo, et al., "3D Human Post Estimation in Video with Temporal Convolutions and Semi-Supervised Training", ETH Zurich, 13 pages. Retrieved from the Internet: URL: https://arxiv.org/abs/1811.11742.

Redmon, et al., "You Only Look Once: Unified, Real-Time Object Detection", University of Washington, 10 pages. Retrieved from the Internet: URL: https://arxiv.org/abs/1506.02640.

Simonyan, et al., "Two-Stream Convolutional Networks for Action Recognition in Videos", Visual Geometry Group, University of Oxford, 11 pages. Retrieved from the Internet: URL: http://arxiv.org/abs/1406.2199.

Sorensen, et al., "Real-Valued Fast Fourier Transform Algorithms", IEEE Transactions on Acoustics, Speech, and Signal Processing, vol. ASSP-35, No. 6, Jun. 1987, pp. 849-863. Retrieved from the Internet: URL: https://pdfs.semanticscholar.org/9cd4/d0cee6c22a65dd6e5ae51c9b6cdbaeb550df.pdf.

Tatarchenko, et al., "Multi-view 3D Models from Single Images with a Convolutional Network", Department of Computer Science, University of Freiburg, pp. 1-20. Retrieved from the Internet: URL: https://arxiv.org/abs/1511.06702.

Tran, et al., "Learning Spatiotemporal Features with 3D Convolutional Networks", Facebook AI Research, 16 pages. Retrieved from the Internet: URL: https://arxiv.org/abs/1412.0767.

Xiao, et al., "Simple Baselines for Human Pose Estimation and Tracking", Microsoft Research Asia, 16 pages. Retrieved from the Internet: URL: https://arxiv.org/abs/1804.06208.

Yeh, et al., "Matrix Profile I: All Pairs Similarity Joins for Time Series: A Unifying View that Includes Motifs, Discords and Shapelets", 2016 IEEE 16th Conference on Data Mining, IEEE Computer Society, pp. 1317-1322. Retrieved from the Internet: URL: https://www.computer.org/csdl/proceedings-article/icdm/2016/07837992/12OmNrAMF0n.

* cited by examiner

SYSTEM FOR SYNCHRONIZING VIDEO OUTPUT BASED ON DETECTED BEHAVIOR

BACKGROUND

Videos that provide instruction to users for performing fitness exercises or other activities may depict instructors performing activities from various viewpoints. The position and rate of movement of the instructor, as well as the viewpoint from which the instructor is shown, may differ from the position, rate of movement, and viewpoint of the user. A lack of synchronization between the movement of the user and the video output viewed by the user may hinder user comprehension and create a negative user experience. Differences between the current pose of the user and the pose shown in the video output, as well as differences between the point of view shown in the video output and the preferred point of view of the user may also hinder user comprehension and negatively impact the user experience.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
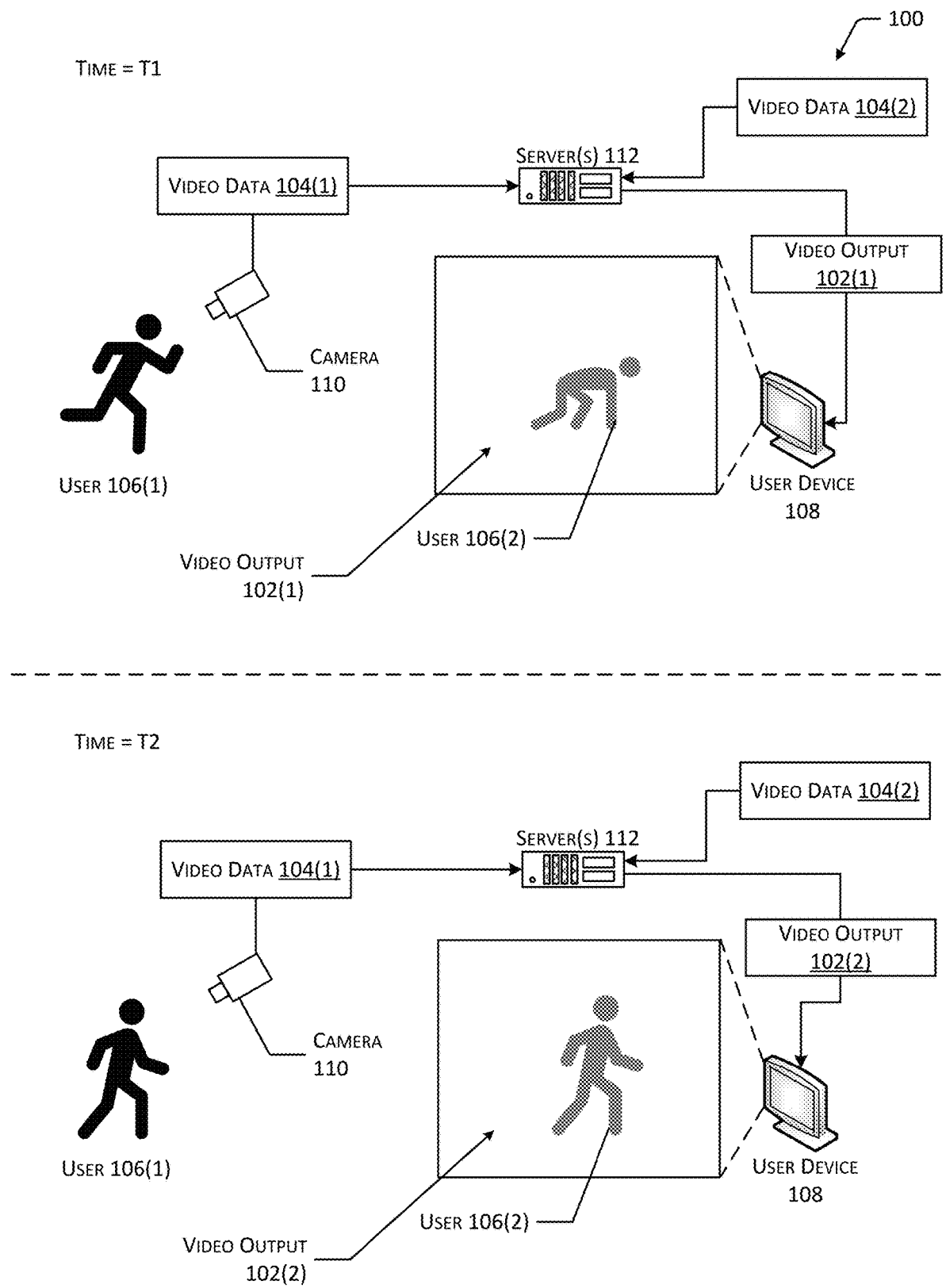
FIG. 1 depicts an implementation of a system for generating video output based on video data that depicts performance of an activity by a user.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Users may access a variety of videos that provide instruction for performance of various activities. For example, a video may provide instruction for performance of a fitness exercise, such as by depicting an instructor or a simulated individual, such as an avatar, performing one or more exercises. As another example, a video may provide instruction for proper ergonomic body positions or movements, such as by depicting an expert or simulated individual in a desired position or undertaking a desired movement. A video may depict an individual moving at a particular rate and may depict the individual from a particular angle. For example, a video may depict a fitness instructor rapidly performing a squatting exercise from the viewpoint of a camera positioned to face the side of the instructor's body. In some cases, a user attempting to perform an activity based on the instruction presented in a video may experience difficulty due to differences in the timing, position, and point of view of the user's activity and those of the presented instruction in the video. For example, a user may perform an activity at a slower or faster rate than that presented in the video, resulting in the user's body being positioned differently than the body of a depicted instructor at various times. Additionally, the viewpoint of the instructor presented in the video may differ from a preferred viewpoint that may facilitate the user's understanding of the activity. For example, a video may present an instructor performing an activity from the viewpoint of a camera facing the front of the instructor, while a user may benefit from a viewpoint that presents the instructor from the side to more clearly visualize movements of certain parts of the instructor's body.

Described in this disclosure are techniques for generating video output that is synchronized with one or more of the position, rate of movement, or viewpoint determined from video data that depicts a user attempting to perform an activity. A user may select a video for use generating video output to be presented on a display device, such as an instructional video for performance of an activity, a video depicting the user's previous performance of the activity, or a video depicting one or more other users' previous performance of the activity. In other implementations, the user may begin performing an activity within the field of view of a camera, the activity performed by the user may be determined by analyzing video data from the camera, and a video associated with the performed activity may be automatically selected and used to generate output for presentation using the display device.

As the user performs the activity, a camera in the environment with the user acquires video data. The video data is provided to a computing device and processed to determine portions that include the user. For example, portions of a video that include a background or other objects may be removed or disregarded to reduce the computational resources used to store or transmit the video data. Removal of background portions or other objects may also improve the accuracy when determining locations of portions of the user's body. In some implementations, based on the video data, point data indicative of the locations of a set of points may be determined for various frames of the video data. Each point may represent the location of a selected body part of the user in three-dimensional space. For example, a first point may represent the location of a user's elbow while a second point represents the location of the user's head. Point data may be determined at different times to determine the locations of body parts at various times. In some implementations, the locations of the points may be constrained by various rules, such as the allowable position of a point representative of a user's wrist relative to a point representative of a user's elbow. One example technique for determining locations of a set of points based on video data is described in "3D Human Pose Estimation in Video with Temporal Convolutions and Semi-supervised Training" by Pavllo et al. (arXiv:1811.11742v2 [cs.CV]).

In other implementations, other methods may be used to determine the locations of body parts of a user. For example, the optical flow (e.g., the pattern of apparent motion) within various regions of each frame of a video may be determined, such as by integrating pixel-level motion fields. This information may be used to determine motion over time for each region, which may in turn be used to determine the position of a user's body at a given time. An example technique for determining optical flow is described in "An Iterative Image Registration Technique With an Application to Stereo Vision" by Lucas et al. in Proceedings of Imaging Understanding Workshop (pp. 121-130). Another example method for determining the locations of body parts of a user may include performing a color (e.g., red-green-blue (RGB)) analysis of the video. Based on the color values for pixels in one or multiple frames of a video, the location of the user within the frame(s) may be detected and a most probable pose of the user may be determined. Example methods for such a technique are described in "Deep Residual Learning for Image Recognition" by He et al. (arXiv:1512.03385v1 [cs.CV]) and "SSD: Single Shot Multibox Detector" by Liu et al. (arXiv:1512.02325v5 [cs.CV]). The locations of the determined points or changes in pixel values, such as motion or color changes, may be used to determine particular portions of the video data, such as particular frames, that correspond to times when the user's body is in a particular pose. For example, portions of the video data that depict the user at the points corresponding to a maximum range of the user during performance of an activity, such as the highest and lowest points of a squat exercise, may be identified based on the locations of the points or changed pixels. As another example, portions of the video data that correspond to target poses of the user's body may be determined based on correspondence between the locations of the points or changed pixels and locations that correspond to selected poses. For example, a target pose of the user's body may include a prone or upright pose, which may be determined based on the locations of the points or changed pixels determined from the video data. In some cases, the locations of the points or changed pixels may be used to determine an erroneous pose of the user. An erroneous pose may include a pose that corresponds to a common error when performing an activity, such as a pose that may result in injury or suboptimal performance of the activity. If a user achieves an erroneous pose, information regarding the error may be included in the video output or provided at the conclusion of the activity. Using the locations of points indicated in the point data, or changed pixel values indicative of motion or color, at least a first pose and a second pose of the user may be identified at different times. For example, two poses corresponding to completion of one repetition of a fitness exercise may be determined, such as the highest and lowest points of a squat exercise.

The video data that is used to generate the video output presented to the user may be analyzed in a similar manner. For example, video data that depicts an instructor or other individual performing the activity may be processed to determine point data and identify particular frames that correspond to the instructor or other individual being in the same or similar poses to the poses identified for the user. Continuing the example, point data indicating sets of points that correspond to locations of body parts of the instructor or other individual may be determined. If a video frame is associated with a set of points for the instructor that is within a threshold distance of a set of points determined for the user, this may indicate that in the particular video frame, the instructor is positioned in the same or a similar pose as the user. Determination of distances between sets of points may include determining a total distance between each point of a first set and each corresponding point of a second set, an average distance (e.g., mean, mode, or median), or a distance between selected points. For example, when a user is performing a squat exercise, distances between points that represent the position of an individual's legs may be weighted more heavily than other points, or points that represent other body parts may be disregarded or provided with a lower weight. In other implementations, the distances between particular points of the first set may be determined, such as distances between particular body parts of the user, and distances between corresponding points of the second set may be determined, such as distances between corresponding body parts of an instructor. If the distances between the points of the first set are similar or proportional to the distances between the points of the second set, this may indicate that the instructor is positioned in the same or a similar pose as the user. As described above, other methods, such as determining optical flow or pixel color values, may be used to determine poses for the depicted individual, in addition to or in place of determining points that represent the locations of body parts of the individual.

Based on the times at which various poses of the user are determined, a first performance rate of the activity by the user may be determined. Similarly, based on the times at which various poses of the instructor or other individual presented in a video output are determined, a second performance rate of the activity by the instructor or other individual may be determined. The relationship between the first and second performance rates may be used to generate video output that depicts performance of the activity by the instructor or other individual at a rate that is within a threshold value of the performance rate of the user. For example, if a video depicts an instructor performing an exercise at a faster rate than that of the user, the video output may depict the instructor moving more slowly, such that the performance rate of the instructor is within a threshold value of that of the user and the instructor achieves particular poses at approximately the same time that the user achieves corresponding poses.

In some implementations, the video output may also be generated based in part on a determined orientation or location of the user relative to the camera. For example, if the user is positioned a particular distance from the camera and is facing a particular direction, the video output may depict an instructor from the same or a similar point of view. In such a case, if an avatar or other visual representation for the user is included in the video output, the point of view associated with the visual representation may be similar to the point of view associated with the instructor, which may enable a user to more closely perform actions indicated by the instructor.

In some implementations, a visual representation of the user, such as an avatar, may be generated based on video data received from the camera. The visual representation of the user may be included in the output presented to the user. For example, an avatar representing the user may be positioned adjacent to or superimposed on a visual representation of an instructor or other individual to facilitate proper performance of an activity by the user. Additionally, in some implementations, if the user's body is determined to be in a pose that corresponds to one or more selected poses, video data depicting the user's body in the particular pose may be stored for viewing at a future time. For example, video data associated with poses that correspond to a maximum range of motion during performance of an activity, such as the highest and lowest points of a squat exercise achieved by the user, may be stored. As another example, a selected pose may include an erroneous pose, such as a pose that includes an incorrect position of the user's knees. Presentation of output that indicates one or more erroneous poses or poses that indicate the maximum range of motion of the user, during or after completion of the activity, may enable a user to view progress with regard to range of motion and body position, and to recognize and reduce errors in performance of the activity.

As one skilled in the art will appreciate in light of this disclosure, certain embodiments may be capable of achieving certain advantages. For example, synchronization of video output based on the actions performed by a user may facilitate user comprehension of content. Presentation of an instructor or other individual that moves at a similar rate to the user and achieves corresponding poses at similar times may enable a user to more accurately move and position the user's body in a manner that avoids injury and accomplishes the goals associated with the activity. Additionally, video output may be used to compare current performance of an activity by a user with previous performance by the user, performance by one or more other users, and so forth. For example, video output presented to a user may be generated based on video data associated with previous performance of the activity by the user, enabling the user to compare a current performance of the activity with a previous performance. In some implementations video data associated with previous performance by the user may be selected automatically for presentation, based on current performance of the activity by the user. For example, if a user achieves a greater range of motion during current performance of the activity, video data associated with the user's previous maximum range of motion may be selected for output to facilitate a comparison between the current performance and previous performance of the activity. As another example, video output presented to a user may be generated based on video data associated with previous performance of the activity by other users, enabling the user to compare performance with that of other users, simulate attendance in a virtual fitness class or other group environment, and so forth. Inclusion of a visual representation of the user may enable the user to directly compare current performance of an activity to previous performance by the user, or to the performance of an instructor or other users. Additionally, generating video output having a point of view that corresponds to the point of view of the user relative to a camera may further facilitate comprehension of an activity. Generation of a user interface that presents video output to a user based on the user's performance of an activity may enable simpler and more efficient generation of user interfaces that present relevant and understandable information to the user, without requiring manual selection or entry of preferences by the user. For example, by performing an activity within the field of view of a camera, a user may cause video output having a relevant viewpoint, performance rate, and pose of an instructor or other individual to be generated, without requiring additional input or selection of options by the user. Additionally, in some cases, relevant video output may be presented to a user automatically, in response to a user's performance of an activity within the viewing area of a camera, without requiring the user to manually select or provide input indicating a desired video output.

FIG. 1 depicts an implementation of a system 100 for generating video output 102 based on video data 104 that depicts performance of an activity by a user 106. Specifically, a first user 106(1) is shown in an environment with a user device 108 that includes a display presenting video output 102(1). While FIG. 1 depicts an example user device 108 as a display device, such as a smart television, a user device 108 may include any type of computing device including, without limitation, personal computers, wearable computing devices, portable computing devices, automotive computing devices, and so forth. One or more cameras 110 in the environment with the first user 106(1) may be used to generate video data 104(1) that depicts performance of an activity by the user 106(1). For example, the video output 102(1) may include instruction for performance of an activity, such as a fitness exercise. The user 106(1) may attempt to perform the activity, based on the instruction, within the field of view of the camera 110. The camera 110 may generate video data 104(1) that depicts the user 106(1) and other objects within the field of view of the camera 110. In some implementations, one or more other types of sensors may also acquire data indicative of performance of the activity by the user 106. For example, held or wearable sensors, such as accelerometers, gyroscopes, or other types of motion or position sensors may be used to determine motion data, position data, and so forth that indicates the position or movement of portions of the user's body. Sensors that detect the movement or position of the user 106(1) or another object may also be integrated within objects in the environment. For example, a floor mat may include a sensor that detect a user's position on top of the mat. As another example, a sensor may be associated with an object that may be manipulated by a user 106, such as a piece of fitness equipment, and may generate data indicative of a position, orientation, or rate of movement of the user 106(1) or object. As yet another example, sensors associated with the user's body may generate data indicative of a user's blood pressure, cardiac pulse (e.g., heart rate), temperature, respiration rate and so forth. In some implementations, sensor data may be used to determine a count or other measurement associated with actions performed by the user 106(1), such as a number of repetitions of a physical exercise that were performed.

One or more servers 112 may receive the video data 104(1) from the camera 110, and in some implementations, other data from other sensors in the environment with the user 106(1). While FIG. 1 depicts a single server 112, any number and any type of computing device may be used including, without limitation, the types of computing devices described with regard to the user device 108. Additionally, while FIG. 1 depicts a server 112, in other implementations, the video data 104(1) may be processed by the camera 110, the user device 108, or by another computing device in an environment with the user device 108, and use of a separate server 112 may be omitted. For example, the user device 108 itself, or another computing device in communication with the user device 108, may receive video data 104(1) from the camera 110 and generate video output 102(1) based in part on analysis of the video data 104(1).

FIG. 1 depicts the system 100 at a first time T1 and a second time T2 subsequent to the first time T1. At the first time T1, the server(s) 112 may access video data 104(2) that may be used to generate first video output 102(1). For example, the video data 104(2) may include instructional content that depicts a second user 106(2), such as a fitness instructor, performing an activity, such as a fitness exercise. Performance of the activity by the second user 106(2) shown in the video output 102(1) may include movement of the second user 106(2) at a particular movement rate and positioning of the second user's body in various poses. As the first user 106(1) attempts to perform the activity in response to the video output 102(1), the first user 106(1) may perform the activity at a different performance rate than the performance rate of the second user 106(2). For example, the first user 106(1) may perform a fitness exercise more slowly than the second user 106(2) shown in the video output 102(1). Additionally, as the first user 106(1) performs the activity, the poses of the first user's body may differ from the poses of the second user's body at particular times. For example, the first user 106(1) and second user 106(2) performing the same activity at different speeds may achieve different poses at the same time. Continuing the example, FIG. 1 depicts the first user 106(1) and the second user 106(2) positioned in different poses at the first time T1.

Differences in the performance rate and the poses of the first user 106(1) and second user 106(2) may hinder comprehension of the activity by the first user 106(1) and create a negative user experience. As such, the server(s) 112 may generate video output 102(2) based on the first video data 104(1) and second video data 104(2) that synchronizes the performance rate of the second user 106(2) relative to that of the first user 106(1) and may cause the second user 106(2) to achieve poses at or near times when the first user 106(1) achieves similar poses. The server(s) 112 may receive first video data 104(1) from the camera 110, which depicts the first user 106(1) performing the activity. Based on the first video data 104(1) and second video data 104(2) that depicts the second user 106(2) performing the activity, the server(s) 112 may generate video output 102(2) in which the performance rate and poses of the second user 106(2) are within a threshold value of the performance rate and poses of the first user 106(1). For example, the server(s) 112 may analyze the first video data 104(1) and second video data 104(2) to determine the poses of the first user 106(1) and second user 106(2), respectively, at various times. Frames of the second video data 104(2) that include poses of the second user 106(2) may be matched with frames of the first video data 104(1) that include corresponding poses of the first user 106(1). Based on the times associated with the frames, the performance rate for the video output 102(2) may be determined. For example, the time between different poses of the first user 106(1), such as a time between the start and end of one repetition of a fitness exercise, may be used to determine a performance rate for the first user 106(1). The time between corresponding poses of the second user 106(2) may be used to determine a performance rate for the second user 106(2). Based on the performance rates determined from the times and poses, second video output 102(2) may be generated in which the performance rate and poses of the second user 106(2) are within a threshold value of the performance rate and poses of the first user 106(1). For example, at the second time T2, FIG. 1 depicts synchronized video output 102(2) in which the pose of the second user 106(2) corresponds to the pose of the first user 106(1).

Figure 2:
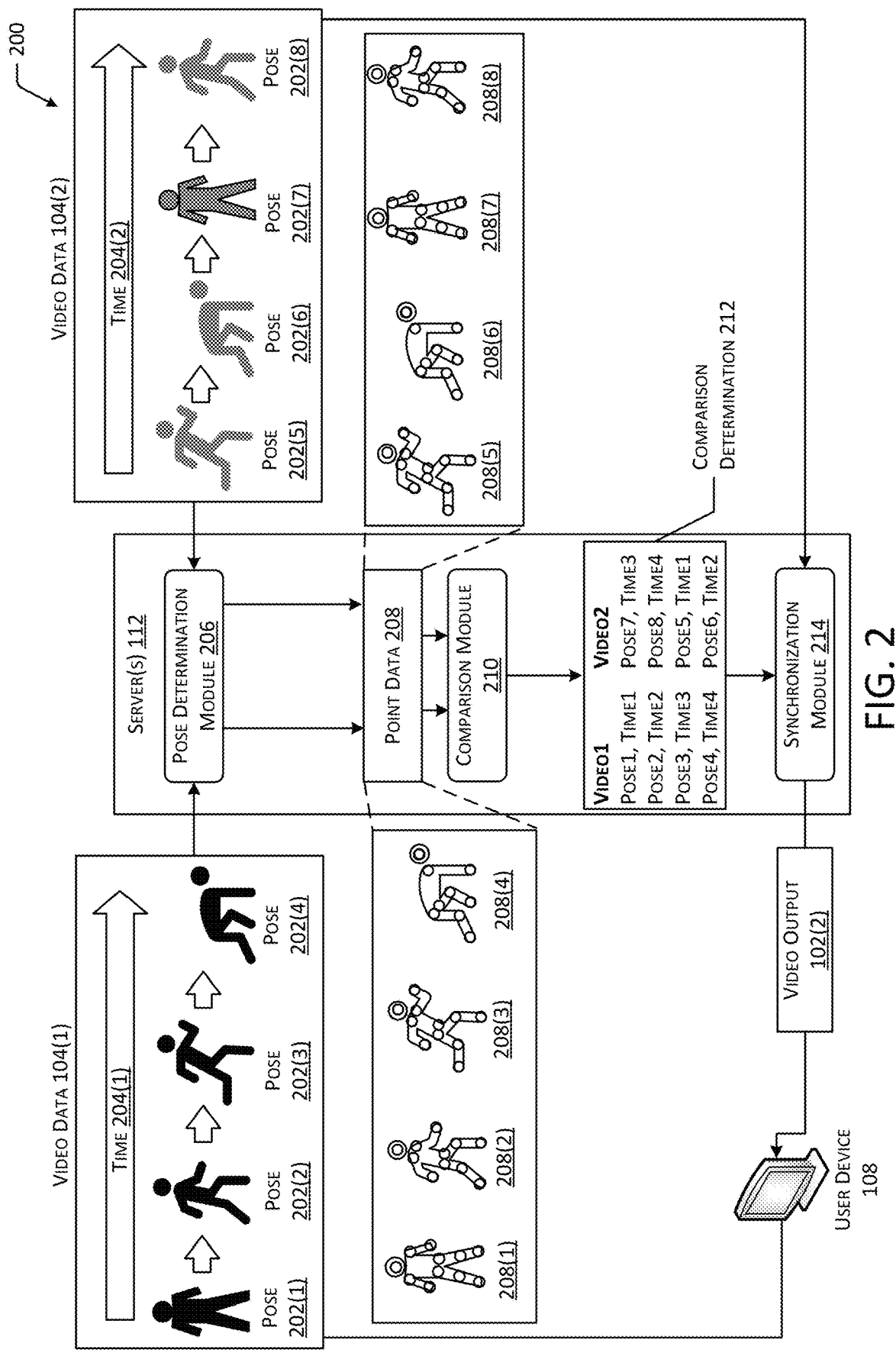
FIG. 2 is a block diagram depicting an implementation of generation of video output based on video data.

FIG. 2 is a block diagram 200 depicting an implementation of generation of video output 102(2) based on video data 104. Specifically, FIG. 2 depicts one or more servers 112 receiving first video data 104(1) and second video data 104(2). As described with regard to FIG. 1, first video data 104(1) may include video data generated by one or more cameras 110 that depicts performance of an activity by a first user 106(1). The second video data 104(2) may include instructional content for performance of the activity and may depict a second user 106(2), such as an instructor, performing the activity. In other implementations, the second video data 104(2) may include video data 104 that was previously generated by recording performance of the activity by the first user 106(1). For example, the second video data 104(2) may be used to compare previous performance of the activity by the first user 106(1) with current performance of the activity by the first user 106(1). In still other implementations, the second video data 104(2) may include video data 104 generated by recording performance of the activity by one or more other users 106.

Video data 104 may include a series of frames, each frame represented by a set of pixels that depict a user 106 and one or more other objects, such as a background, at a particular time. For example, as a user 106 performs an activity, such as a fitness exercise, the user's body may achieve particular poses 202 at particular times. Continuing the example, FIG. 2 depicts the first video data 104(1) representing a user 106 in particular poses 202 at different times. The passage of time 204(1) is indicated by the arrow. For example, at a first time the user's body may be in a first pose 202(1), at a second time the user's body may be in a second pose 202(2), at a third time the user's body may be in a third pose 202(3), and at a fourth time the user's body may be in a fourth pose 202(4). While FIG. 2 depicts the video data 104(1) including four poses 202 for illustrative purposes, video data 104 may include any number of frames that depict a user 106 in any number of poses 202.

The second video data 104(2) is also shown representing a user 106 in different poses 202 at different times, with the passage of time 204(2) indicated by the arrow. As described previously, the user 106 presented in the second video data 104(2) may be the same user 106 presented in the first video data 104(1), or a different user 106. FIG. 2 depicts the second video data 104(2) depicting a user 106 in a fifth pose 202(5) at a first time, a sixth pose 202(6) at a second time, a seventh pose 202(7) at a third time, and an eighth pose 202(8) at a fourth time. Because the first video data 104(1) and second video data 104(2) depict users performing the same or a similar activity, one or more of the poses 202 presented in the second video data 104(2) may correspond to one or more poses 202 presented in the first video data 104(1). For example, first video data 104(1) depicting a first user 106(1) performing a squat exercise may include a pose 202 representing the first user 106(1) at the bottom point of the squat exercise with bent knees, and a pose 202 representing the first user 106(1) at the top point of the squat exercise when standing upright. Second video data 104(2) depicting a second user 106(2) performing the squat exercise may also include poses 202 representing the second user 106(2) at the top and bottom points of the exercise, but these poses 202 may occur at different times than the corresponding poses 202 in the first video data 104(1). For example, a user 106(1) watching video output 102 generated using the second video data 104(2) may perform an activity at a different performance rate and achieve different poses 202 at different times than the user 106(2) presented in the video output 102. As shown in FIG. 2, the fifth pose 202(5) of the second video data 104(2) is similar to the third pose 202(3) of the first video data 104(1), the sixth pose 202(6) is similar to the fourth pose 202(4), the seventh pose 202(7) is similar to the first pose 202(1), and the eighth pose 202(8) is similar to the second pose 202(2).

A pose determination module 206 associated with the server(s) 112 may determine the particular poses 202 associated with one or more frames of the first video data 104(1) and second video data 104(2). In some implementations, the pose determination module 206 may process video data 104 by performing object recognition, such as by extracting a portion of a frame of video data 104 that presents a user 106 from a portion of the frame that presents a background or other objects. Example techniques for object-detection are described in "You only look once: Unified, real-time object detection" by Redmon et al. in Proceedings of the IEEE Computer Society Conference on Computer Vision and Pattern Recognition (Vol. 2016-December, pp. 779-788) and "Feature pyramid networks for object detection" by Lin et al., in Proceedings—30th IEEE Conference on Computer Vision and Pattern Recognition (Vol. 2017-January, pp. 936-944). Additionally, in some implementations, the pose determination module 206 may determine the position of one or more body parts of a depicted user 106 by determining point data 208. Point data 208 may indicate the characteristics and locations of one or more sets of points, each point representing the location of a selected body part determined based on the video data 104. For example, for a given point, point data 208 may indicate an identifier for the point, such as an indication that the point represents the location of a particular user's right elbow, a location of the point, such as coordinates of the point within a frame of a video or a distance and direction of the point relative to one or more other points or an edge of the frame, and a time associated with the point, such as a particular frame of a video or the time associated with the frame. Continuing the example, respective points may correspond to the determined locations of a user's head, shoulders, elbows, knees, and so forth. One example method for determining point data 208 indicating the locations of sets of points based on video data 104 is described in Pavllo et al., described previously. Another example method is described in "Can 3D pose be learned from 2D projections alone?" by Drover et al., in "Lecture Notes in Computer Science (including subseries Lecture Notes in Artificial Intelligence and Lecture Notes in Bioinformatics) (Vol. 11132 LNCS, pp. 78-94).

The location of each point in a set of points may be determined based in part on object recognition and in part on one or more rules that constrain the location of particular points. For example, the determined location of a point representing a user's wrist may be constrained based on the determined location of a point representing a user's elbow. The pose determination module 206 may determine particular times or frames within video data 104 that depict a user 106 in particular poses 202 based on the point data 208. For example, a particular configuration of points may indicate that the body parts of the user 106 are positioned in a standing, upright position, while a different configuration of points may indicate that the body parts of the user 106 are positioned in a crawling position. In some implementations, the pose determination module 206 may determine correspondence between the point locations for a set of points and pose data that associates identifiers for particular poses 202 with locations of one or more points. If the locations of the points within a set match those of a particular pose 202 within a threshold tolerance, the locations of the points may indicate that the body of the user 106 is positioned in the corresponding pose 202. In some cases, a particular pose 202 may be determined based on only a subset of the point data 208 indicating a subset of the points within a set of points. For example, if a pose 202 is associated with a squatting exercise, the locations of points associated with a user's legs may be used to determine the pose 202, while locations of points associated with the user's arms may be disregarded. As another example, particular points of the point data 208 may be provided with a greater weight than a weight associated with other points. For example, if a pose 202 is associated with a squatting exercise, the locations of points associated with a user's knees may be associated with a greater weight than the location of a point associated with the user's head.

FIG. 2 depicts first point data 208(1) indicating a first set of points associated with the first pose 202(1), second point data 208(2) indicating a second set of points associated with the second pose 202(2), third point data 208(3) indicating a third set of points associated with the third pose 202(3), and fourth pout data 208(4) indicating a fourth set of points associated with the fourth pose 202(4). FIG. 2 also depicts fifth point data 208(5) indicating a fifth set of points associated with the fifth pose 202(5), sixth point data 208(6) indicating a sixth set of points associated with the sixth pose 202(6), seventh point data 208(7) indicating a seventh set of points associated with the seventh pose 202(7), and eighth point data 208(8) indicating an eighth set of points associated with the eighth pose 202(8). The locations of the points associated with particular point data 208 for the first video data 104(1) relative to the locations of points associated with particular point data 208 for the second video data 104(2) may be used to determine frames of the second video data 104(2) that include poses 202 that correspond to particular poses 202 in the first video data 104(1).

A comparison module 210 associated with the server(s) 112 may determine particular poses 202 in the second video data 104(2) that correspond to particular poses 202 in the first video data 104(1) based on the point data 208 determined for the first video data 104(1) and second video data 104(2). For example, the comparison module 210 may determine the distance between a first set of points determined from the first video data 104(1) and a corresponding set of points determined from the second video data 104(2) to be less than a threshold distance. Continuing the example, FIG. 2 depicts a set of points for the first point data 208(1) and a set of points for the seventh point data 208(7) being associated with the first pose 202(1) and the seventh pose 202(7), which appear identical or similar to one another. By determining that the first set of points is within a threshold distance of the seventh set of points, correspondence between the first pose 202(1) and seventh pose 202(7) may be determined. The proximity of two sets of points indicated in point data 208 determined from different video data 104 may indicate that at the times associated with the points, the bodies of the respective users 106 had achieved similar poses 202.

In some implementations, the distance between two sets of points may include determining an aggregate distance in three-dimensional space. For example, the distance between a point representing the head of a first user 106(1) and the point representing the head of a second user 106(2) may be determined, then added to the distance between two points representing other corresponding body parts, and so forth, until an aggregate distance between the sets of points is determined. In other implementations, the distance between two sets of points may include determining an average distance between corresponding points of the sets. In still other implementations, distances between different corresponding points may be weighted. For example, when video data 104 depicts users 106 performing squatting exercises, distances between points that represent the position of the users' legs may be associated with a greater weight value than points that represent the position of users' heads. In some cases, one or more points may be disregarded when determining the distance between sets of points. For example, when video data 104 depicts users 106 performing squatting exercises, points that represent the hands of the users 106 may be disregarded.

In other implementations, similarities between sets of points may be determined based on distances between points within a set. For example, the comparison module 210 may determine the distance between a point that represents the head of a first user 106(1) and a point that represents the shoulder of the first user 106(1), and may similarly determine distances between other points that represent other body parts of the first user 106(1) and the directions in which the points are spaced from one another. If the relative locations of a set of points associated with the second user 106(2) are determined to have a similar or proportional relationship with regard to spacing and direction, when compared to a set of points associated with the first user 106(1), this may indicate that the sets of points represent identical or similar poses 202 of the users 106. For example, a first point of a first set of points representing the first user 106(1) may be positioned a certain distance and direction relative to a second point of the first set of points. Other points of the first set may similarly be positioned certain distances and directions relative to one another. Similarly, a first point of a second set of points representing the second user 106(2) may also be positioned a certain distance and direction relative to a second point of the second set of points. If the relationship between at least two points of the first set representing the first user 106(1) and at least two points of the second set representing the second user 106(2) are within a threshold value to one another, this may indicate that the two users 106 are in a similar pose 202. For example, if the points representing the position of the knees, ankles, and hips of the first user 106(1) form a right angle, while the points representing the knees, ankles, and hips of the second user 106(2) form an angle that is within a threshold deviation of a right angle, this may indicate that both users 106 are in a squatting position.

The comparison module 210 may generate a comparison determination 212 based on the point data 208 determined from the first video data 104(1) and second video data 104(2). The comparison determination 212 may associate particular poses 202 determined from the first video data 104(1) with corresponding poses 202 determined from the second video data 104(2) based on associated sets of points being within threshold distances from one another or having similar relationships between points of a set. For example, FIG. 2 depicts the comparison determination 212 indicating that the first pose 202(1) corresponds to the seventh pose 202(7), the second pose 202(2) corresponds to the eighth pose 202(8), the third pose 202(3) corresponds to the fifth pose 202(5), and the fourth pose 202(4) corresponds to the sixth pose 202(6). In some cases, the comparison determination 212 may also indicate the times associated with each corresponding pose 202. For example, the first video data 104(1) may depict the first user 106(1) in the first pose 202(1) at a first time, while the second video data 104(2) depicts the second user 106(2) in the corresponding seventh pose 202(7) at a different time.

The times at which corresponding poses 202 occur in the second video data 104(2) may be used to generate video output 102(2) in which poses 202 achieved by a visual representation of the second user 106(2) correspond to user behaviors determined using the first video data 104(1). For example, if a user 106(1) is performing a repeating activity, such as a fitness exercise that includes repeated motions, a performance rate for the first user 106(1) may be determined based on the times at which the first user 106(1) achieves particular poses 202. The future times at which the first user 106(1) will achieve subsequent poses 202 may be determined based on the performance rate. A synchronization module 214 associated with the server(s) 112 may generate video output 102(2) that is synchronized based on the first video data 104(1) using the comparison determination 212. For example, the synchronization module 214 may determine a frame of the second video data 104(2) that depicts the second user 106(2) in a pose 202 that corresponds to a pose 202 currently achieved by the first user 106(1), then may cause the second video data 104(2) to be presented in a manner that causes the second user 106(2) to move or otherwise perform the activity at a performance rate within a threshold value of the performance rate determined for the first user 106(1).

Figure 3:
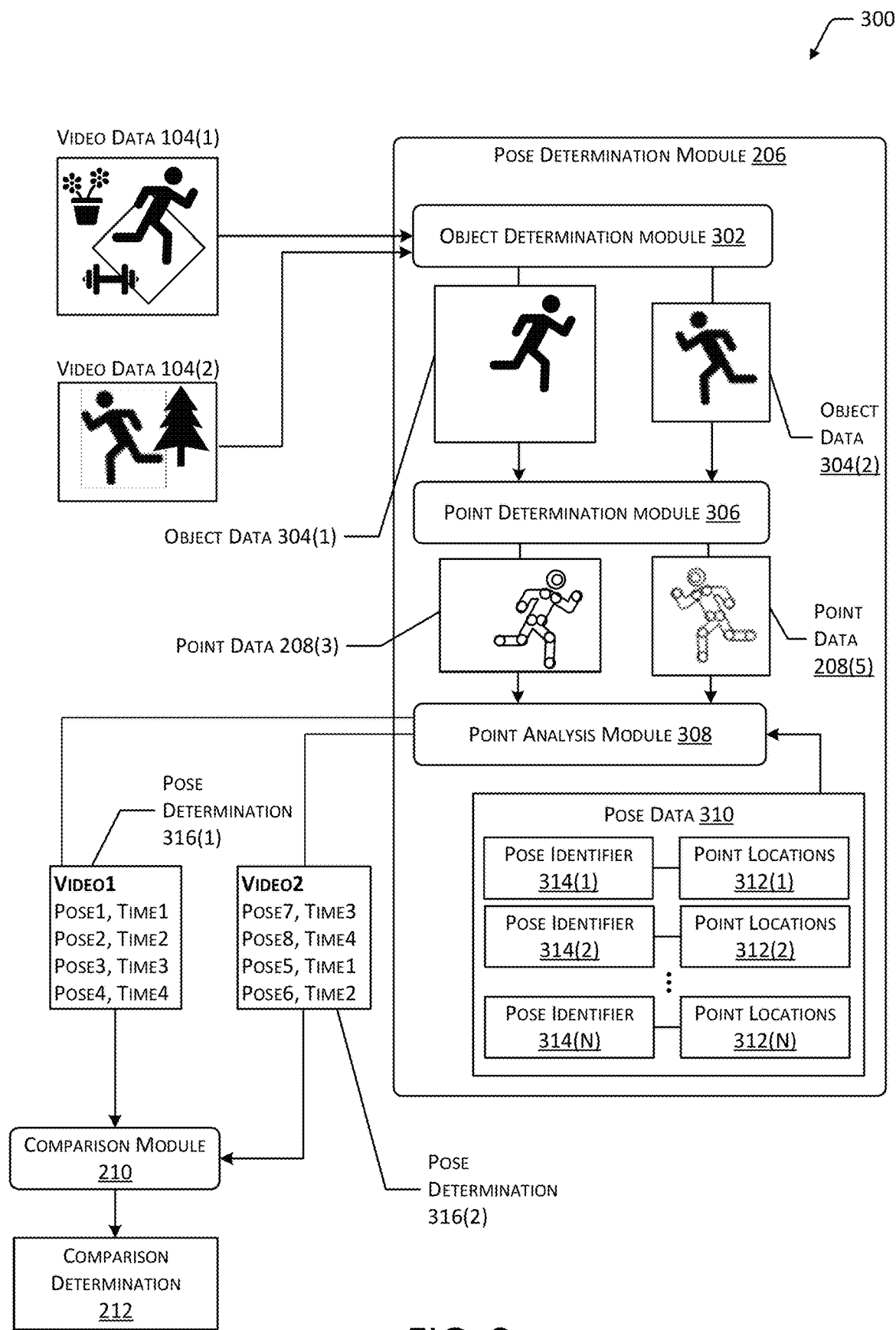
FIG. 3 is a block diagram depicting an implementation of generation of a comparison between different video data.

In other implementations, the pose determination module 206 may determine the poses 202 achieved by the first user 106(1) and second user 106(2) at various times 204 using other methods in addition to or in place of determining point data 208. For example, as descried previously, the pose determination module 206 may determine the optical flow (e.g., pattern of motion) for one or more frames of the first video data 104(1) and second video data 104(2). Based on the motion over time determined for various regions of the video, the position of parts of a user's body may be determined. By determining that the positions of various parts of a user's body, as indicated by the motion in particular regions of the video data 104, correspond to a set of threshold positions, frames of the video data 104 in which a user 106 is in a particular pose 202 may be determined. As another example, the pose determination module 206 may determine pixel values for various frames of video data 104, such as color (e.g., RGB) values. The color values or other characteristics of pixels may be used to determine the locations of various parts of a user's body. Correspondence between the determined positions of the body parts of the user 106 and a threshold set of positions may be used to determine particular frames of the video data 104 in which the user 106 is in a particular pose 202. FIG. 3 is a block diagram 300 depicting an implementation of generation of a comparison between different video data 104. As described with regard to FIG. 2, a pose determination module 206 or other module associated with one or more server(s) 112 may be used to determine portions of received video data 104(1) in which the body of the depicted user 106 has achieved particular poses 202. Video data 104(1) may include various objects within the field of view of a camera 110, which may include a user 106, a background, other objects, and so forth. Storage and transmission of video data 104(1) that includes extraneous objects in addition to the user 106 may consume computational resources. Additionally, the presence of other objects besides the user 106 may cause inaccuracies when analyzing the video data 104(1) to determine the pose 202 of the user 106. As such, in some implementations, an object determination module 302 may be used to determine or indicate portions of the video data 104(1) that include the user 106, while removing, disregarding, or indicating portions of the video data 104(1) that do not include the user 106. For example, the object determination module 302 may generate object data 304(1) based on the video data 104(1). The object data 304(1) may include portions of a frame of the video data 104(1) that include the user 106. Example techniques for object-detection are described in Redmon et al. and Lin et al., described previously.

A point determination module 306 may determine point data 208(3), representing a set of points, based on the object data 304. As described with regard to FIG. 2, each point within a set of points may represent the location of a selected body part of the user 106, such as a joint, head, extremity, and so forth. Example methods for determining sets of points are described in Pavllo et al. and Drover et al., described previously. In some implementations, the locations of particular points may be determined based in part on object recognition and in part on one or more rules that constrain the location of particular points. For example, the location of a point representing a user's elbow may be determined by using object recognition techniques to determine a set of pixels within a frame of video data 104(1) that correspond to a selected arrangement of pixels that indicates an elbow. However, the determined location of a point representing the elbow may be constrained based on the determined locations of other points representing a user's wrist or shoulder.

A point analysis module 308 may determine a particular pose 202 associated with a frame of video data 104(1) based on the locations of the determined points indicated in the point data 208(3). In some implementations, the point analysis module 308 may determine correspondence between the locations of the points determined from the video data 104(1) and pose data 310. Pose data 310 may associate point locations 312 for sets of points with corresponding pose identifiers 314 indicative of particular poses 202. For example, a first set of point locations 312(1) may be associated with a pose identifier 314(1) that corresponds to an upright pose 202 while a second set of point locations 312(2) may be associated with a pose identifier 314(2) that corresponds to a prone pose 202. Any number of pose identifiers 314(N) may be associated with corresponding sets of point locations 312(N).

In some implementations, a set of point locations 312 may include a location value for every point within a set of points associated with the point data 208(3). In other implementations, a set of point locations 312 may include a location value for only a subset of the points within a set. In still other implementations, a set of point locations 312 may include a weight value or one or more threshold values for one or more of the points. For example, when performing a squat exercise, a threshold value associated with the position of a user's knees may be low, while a threshold value associated with the position of a user's hands may be high. As a result, if a pose 202 indicating a squatting position is determined, the locations of the points that represent the user's knees may be identical or similar to the point locations 312 indicated in the pose data 310, while the locations of the points that represent the user's hands may deviate from the point locations 312 associated with those points. In some implementations, point locations 312 may include coordinate locations in a frame. In other implementations, point locations 312 may include locations relative to an origin, such as a corner of a frame of the video data 104(1) that includes the user 106 or a first point of the set of points. In still other implementations, point locations 312 may include locations of points relative to other points. For example, a user 106 achieving a squatting pose 202 may be determined based on the distance between points representing the user's hips and points representing the user's knees. The point analysis module 308 may generate a pose determination 316(1) indicative of poses 202 determined from the point data 208 for the video data 104(1) at various times. For example, FIG. 3 depicts the pose determination 316(1) indicating four poses 202 determined based on the video data 104(1) at four different times. Any number of poses 202 may be determined at any number of times.

As described with regard to FIG. 2, in other implementations, the pose 202 of a user 106 may be determined, based on the object data 304, without determining point data 208. For example, based on motion, color, or other characteristics of pixels within the object data 304, locations of particular parts of user's bodies may be determined. In such a case, the pose data 310 may associate a pose identifier 314 for a pose 202 with a corresponding set of locations for body parts of a user 106, and a pose determination 316 may be generated based on correspondence between the determined locations of body parts and the pose data 310.

A comparison module 210 may determine portions of second video data 104(2) that present poses 202 that correspond to portions of the first video data 104(1). For example, a user 106(2) presented in second video data 104(2) may achieve an identical or similar pose 202 to a pose 202 achieved by the first user 106(1) presented in first video data 104(1). The comparison module 210 may generate a comparison determination 212 that indicates frames of the first video data 104(1) that correspond to frames of the second video data 104(2). In some implementations, the comparison determination 212 may be generated based on pose determinations 316(1) for the first video data 104(1) and second video data 104(2). For example, FIG. 3 depicts a first pose determination 316(1) determined based on first video data 104(1) and a second pose determination 316(2) that may be determine based on second video data 104(2) using a similar process to that described with regard to the first video data 104(1). Continuing the example, an object determination module 302 may generate object data 304(2) that depicts a user 106(2) based on the second video data 104(2). A point determination module 306 may generate point data 208(5) that indicates locations of a set of points based on the object data 304(2). A point analysis module 308 may generate a pose determination 316(2) based on the point data 208(5) and pose data 310. While FIG. 3 depicts the comparison module 210 receiving the pose determinations 316, in other implementations, the comparison module 210 may receive a portion of the point data 208 indicative of locations of at least a subset of the points 208 determined for each video data 104 and may determine correspondence between particular frames of the video data 104 based on the locations of the points.

Figure 4:
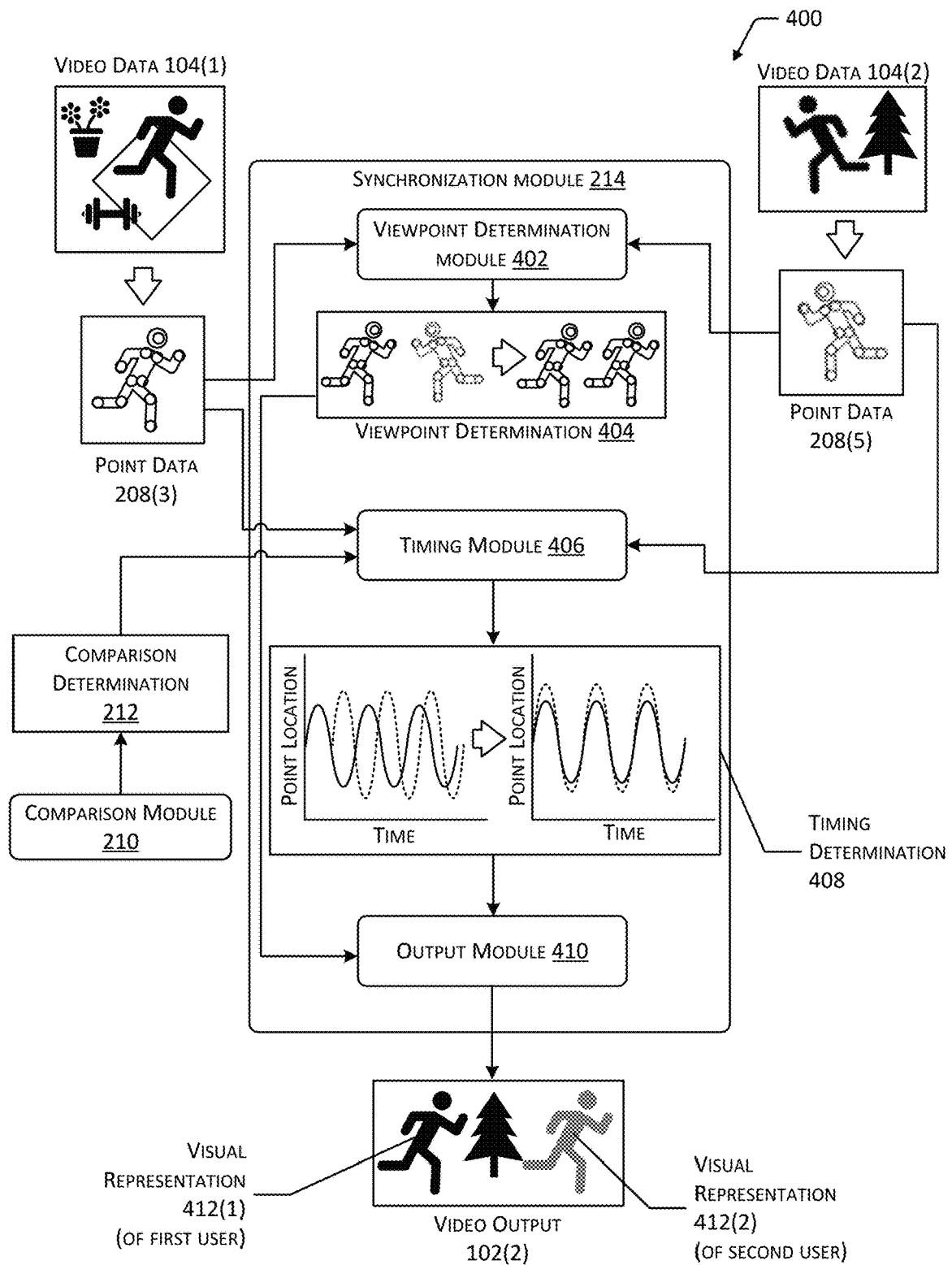
FIG. 4 is a block diagram depicting an implementation of generation of video output based on video data.

FIG. 4 is a block diagram 400 depicting an implementation of generation of video output 102(2) based on video data 104. Video data 104 may depict one or more users 106 performing an activity. For example, first video data 104(1) may depict a first user 104(1) performing an activity within a field of view of a camera 110. Second video data 104(2) may depict a second user 104(2) performing the activity while providing instruction, in response to which the first user 104(1) may attempt to perform the instructed activity. In some cases, the second video data 104(2) may present the second user 106(2) from a different viewpoint when compared to the first user 106(1), such as a different distance or orientation relative to a camera 110. Additionally, in some cases, the second video data 104(2) may present the second user 106(2) performing the activity at a different performance rate than the first user 106(1) and achieving different poses 202 at different times when compared to the first user 106(1). As described with regard to FIGS. 2 and 3, video data 104 may be processed to determine point data 208 that indicates locations of a set of points. Each point may represent a location of a particular body part of the depicted user 106. For example, FIG. 4 depicts point data 208(3) representing a set of points determined based on the first video data 104(1) and point data 208(5) representing a set of points determined based on the second video data 104(2). In other implementations, other methods for determining the pose 202 achieved by a user 106 may be used without necessarily determining point data 208. For example, the motion, color, or other characteristics of pixels may be used to determine locations of body parts of a user 106, which may be used to determine poses 202 achieved by the user 106 in various frames of the video data 104. A comparison module 210 or other module associated with the servers(s)

112 may generate a comparison determination 212 based on the locations of one or more points or other determined locations of body parts at particular times. For example, the comparison determination 212 may indicate a particular frame of the second video data 104(2) in which the second user 106(2) is positioned in the same pose 202 as the first user 106(1) in a particular frame of the first video data 104(1). Corresponding poses in the first video data 104(1) and second video data 104(2) may be used to generate video output 102(2) that presents the second user 106(2) with a similar rate of movement and position to the first user 106(1).

A viewpoint determination module 402 may be used to determine a viewpoint of the video output 102(2) that corresponds to a viewpoint of the first video data 104(1). For example, FIG. 4 depicts the first video data 104(1) presenting a first user 106(1) having a first orientation relative to a camera 110. Continuing the example, the first user 106(1) is shown facing toward the right. The second video data 104(2) presents a second user 106(2) having a different orientation. For example, the second video data 104(2) depicts the second user 106(2) facing toward the left. The viewpoint determination 404 may be used to determine the viewpoint presented in the first video data 104(1) and provide video output 102(2) generated based on the second video data 104(2) with a viewpoint having a distance and orientation within a threshold distance and threshold orientation of the viewpoint of the first video data 104(1).

Based on one or more frames of the first video data 104(1), point data 208 indicating locations of one or more sets of points, or pixel characteristics indicating locations of body parts of the first user 106(1), may be determined. An orientation and distance of the first user 106(1) relative to a camera 110 may additionally be determined. In some implementations, an orientation and distance of the second user 106(2) relative to a camera 110 or other viewpoint may also be determined. The viewpoint determination module 402 may generate a viewpoint determination 404 indicative of an orientation, a distance, or other characteristics of a viewpoint for the video output 102(2) based on the characteristics of the first video data 104(1). In some implementations, the viewpoint determination 404 may indicate a manner in which the second video data 104(2) may be modified to generate the video output 102(2). For example, the video output 102(2) may be generated by modifying the second video data 104(2) in a manner that changes the apparent perspective or other characteristics of the viewpoint. In other implementations, the viewpoint determination 404 may indicate a particular viewpoint or particular video data 104(2) that may be used to generate the video output 102(2). For example, a camera 110 may be used to record the second user 106(2) performing the activity from different angles, distances, and viewpoints. The viewpoint determination 404 may include an indication of the particular video data 104(2) having a viewpoint that most closely corresponds to the viewpoint determined from the first video data 104(1). In still other implementations, the viewpoint determination 404 may include an indication of a particular angle, distance, or other characteristics of the viewpoint determined from the first video data 104(1). The video output 102(2) may be generated to include a viewpoint that is within a threshold value of the viewpoint determined from the first video data 104(1). For example, the video output 102(2) may include an avatar or other simulated user 106, which may be generated using a viewpoint that corresponds to the viewpoint determined from the first video data 104(1). One example method for determining viewpoints from images or frames of video data 104 is described in "Multi-view 3D Models from Single Images with a Convolutional Network" by Tatarchenko et al., in Lecture Notes in Computer Science (including subseries Lecture Notes in Artificial Intelligence and Lecture Notes in Bioinformatics) (Vol. 9911 LNCS, pp. 322-337).

A timing module 406 may determine a performance rate and poses 202 for the video output 102(2) based on the performance rate and poses 202 of the first user 106(1) determined from the first video data 104(1). For example, a first user 106(1) depicted in the first video data 104(1) may perform an activity at a different rate than a second user 106(2) depicted in the second video data 104(2). Additionally, the first user 106(1) and the second user 106(2) may begin performing the activity at different starting times and cease performing the activity at different ending times. As a result of the different performance rates and different starting and ending times, the body of the first user 106(1) shown in the first video data 104(1) and the body of the second user 106(2) shown in the second video data 104(2) may be in different poses 202 at a given time, and may also achieve similar poses 202 at different times. Generation of video output 102(2) may include causing the video output 102(2) to present the second user 106(2) or a representation of the second user 106(2) performing the activity at a performance rate similar to that of the first user 106(1) determined from the first video data 104(1), and achieving particular poses 202 at times similar to the times at which the first user 106(1) achieves corresponding poses 202.

The timing module 406 may determine one or more of a performance rate, a starting time, an ending time, and particular times at which the first user 106(1) achieves particular poses 202 based on the first video data 104(1). In some implementations, the timing module 406 may determine similar information with regard to the second video data 104(2). For example, FIG. 4 illustrates the timing determination 408 including a solid line representing the location of a particular point of the point data 208(3) at different times, and a dashed line representing the location of a corresponding point of the point data 208(5) determined from the second video data 104(2) at different times. As shown in FIG. 4, the rate at which the point determined from the second video data 104(2) changes in location is greater than the rate at which the corresponding point determined from the first video data 104(1) changes location. Additionally, the starting time at which the point from the second video data 104(2) begins movement and the ending time at which the point from the second video data 104(2) ceases movement occur after the starting and ending times associated with the point from the first video data 104(1). As a result, the location of the point from the second video data 104(2) may differ from the location of the point from the first video data 104(1) at a given time. However, the point from the second video data 104(2) may be associated with poses 202 that correspond to poses 202 associated with the point from the first video data 104(1) at various times. In some implementations, the comparison determination 212 generated by the comparison module 210 may be used to determine corresponding poses 202 in the first video data 104(1) and second video data 104(2). In other implementations, the locations of particular pixels, regions of a frame of video data 104, or determined locations of body parts of the user 106, may be determined, at different times, for both the first video data 104(1) and second video data 104(2). In such a case, the locations of the pixels or body parts may be used to generate the timing determination 408.

The timing determination 408 may indicate one or more of a starting time, an ending time, a performance rate, or particular positions of one or more points at particular times, which may be used to synchronize the video output 102(2) with the first video data 104(1). For example, FIG. 4 depicts the timing determination 408 representing video output 102(2) generated using the second video data 104(2) as a dashed line and the first video data 104(1) as a solid line. After synchronizing the video output 102(2) with the first video data 104(1), the location of a particular point in the video output 102(2) may change in location at a similar rate as a corresponding point in the first video data 104(1) and may achieve corresponding positions at the same time as a corresponding point in the first video data 104(1). In some cases, the particular location of a point in the video output 102(2) may differ from a corresponding point in the first video data 104(1) while being associated with a corresponding pose 202. For example, an instructor depicted in the second video data 104(2) may perform an activity using a greater range of motion than a user 106(1) depicted in the first video data 104(1). Continuing the example, the lowest and highest positions of the instructor's body during a squat exercise may be lower and higher, respectively, than corresponding positions of the user's body. An example method for time synchronization is described in "The Wavelet Transform, Time-Frequency Localization and Signal Analysis" by Daubechies, in IEEE Transactions on Information Theory, 36(5), pp. 961-1005.

An output module 410 may generate video output 102(2) based on the timing determination 408 and the viewpoint determination 404. In some implementations, generation of the video output 102(2) may include generating visual representations 412 of users 106. For example, a first visual representation 412(1) may be generated based on the first video data 104(1) and may depict the approximate movement and pose 202 of the first user 106(1). A second visual representation 412(2) may be generated based on the second video data 104(2) and may depict the approximate movement and pose 202 of the second user 106(2). The poses 202 and performance rate determined from the first video data 104(1) may be used to determine the rate of movement of the second visual representation 412(2) and the times that particular poses 202 are achieved by the second visual representation 412(2). For example, FIG. 4 depicts the video output 102(2) presenting a visual representation 412(2) of the second user 106(2) having a similar viewpoint (e.g., orientation relative to a camera 110) as that presented in the first video data 104(1), and achieving a similar pose 202 to the first user 106(1) shown in the first video data 104(1). The visual representation 412(2) of the second user 106(2) may be presented adjacent to or superimposed on a visual representation 412(1) of the first user 106(1). Presentation of both visual representations 412 may enable the first user 106(1) to visually compare movements and poses 202 of the first visual representation 412(1) to those of the visual representation 412(2) of the second user 106(2).

Figure 5:
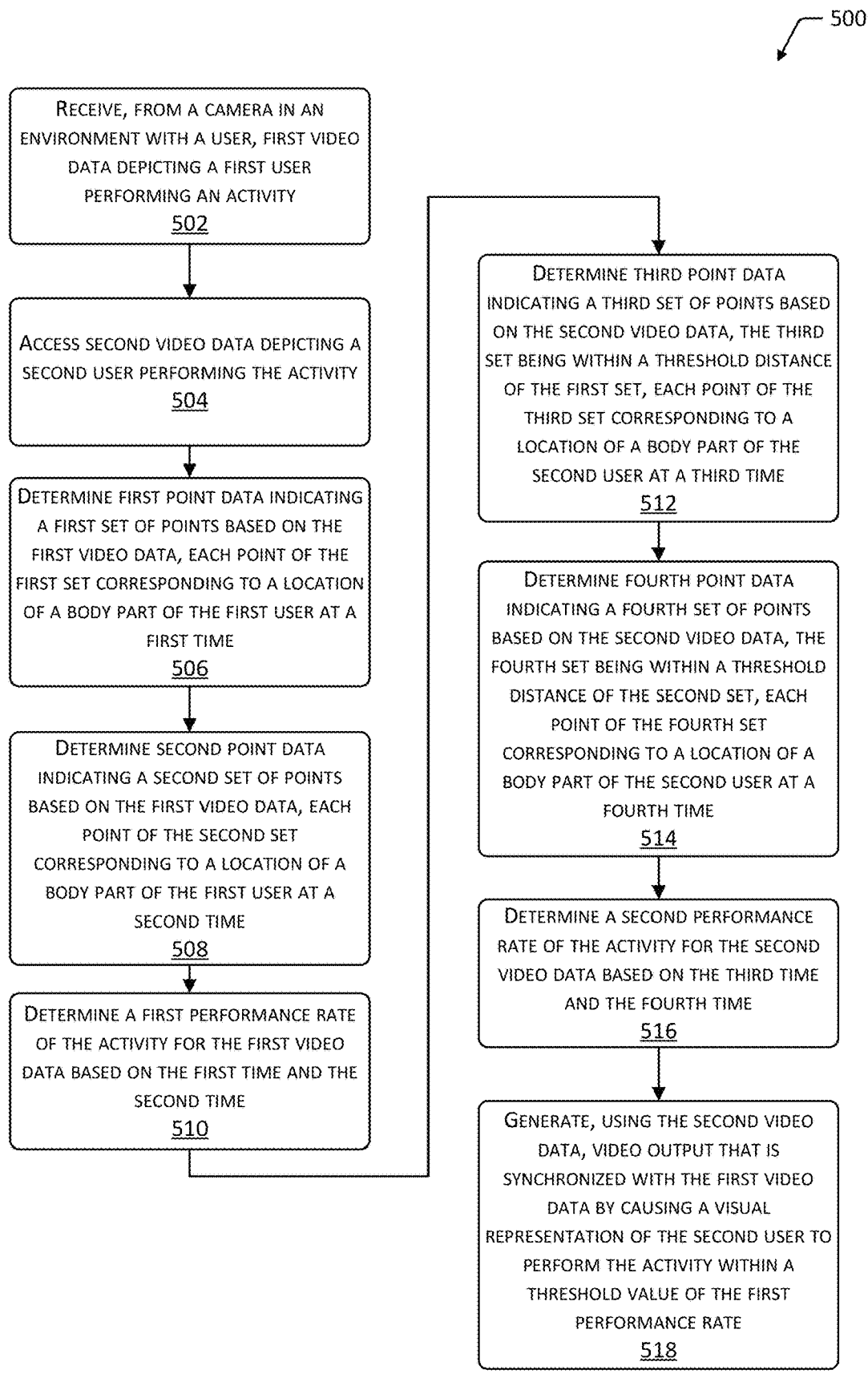
FIG. 5 is a flow diagram depicting an implementation of a method for generating video output based on video data.

FIG. 5 is a flow diagram 500 depicting an implementation of a method for generating synchronized video output 102 based on video data 104. At 502, first video data 104(1) may be received from a camera 110 in an environment with a first user 106(1). The first video data 104(1) may depict the first user 106(1) performing an activity. For example, a first user 106(1) may perform a fitness exercise, ergonomic movement, or other type of activity within the field of view of one or more cameras 110. In some implementations, other types of sensors in addition to or in lieu of cameras 110 may be used to determine information regarding performance of the activity by the first user 106(1). For example, held or wearable sensors or sensors associated with the environment may be used to determine the position or motion of the first user 106(1). Sensors may also be used to determine physiological data associated with the first user 106(1), such as a cardiac pulse, temperature, blood pressure, breath rate, and so forth. Sensors may additionally be used to determine completion of actions by the first user 106(1) such as by determining a count of times a repetitive action, such as a fitness movement, was performed.

At 504, second video data 104(2) depicting a second user 106(2) performing the activity may be accessed. For example, second video data 104(2) may depict an instructor performing the activity while providing instruction, responsive to which the first user 106(1) may attempt to perform the activity. In other implementations, the second video data 104(2) may depict the first user 106(1) performing the activity at a previous time. For example, the first user 106(1) may wish to compare one or more characteristics of a current performance of an activity, such as the user's range of motion, to previous performance of the activity by the first user 106(1). In still other implementations, second video data 104(2) may depict one or more other users 106 performing the other activity at a previous time. For example, the first user 106(1) may wish to cause video output 102 representative of a simulated fitness class to be generated, in which visual representations 412 of multiple users 106 are depicted performing an activity. In some implementations, the second video data 106(2) that is accessed may be selected by the first user 106(1). In other implementations, the second video data 104(2) may be selected automatically, in response to at least a portion of the first video data 104(1). For example, the first user 106(1) may attempt to perform an activity within a field of view of the camera 110. The activity that is performed may be determined based on characteristics of the first video data 104(1), then second video data 104(2) that corresponds to the determined characteristics of the first video data 104(1) may be accessed.

At 506, first point data 208(1) that indicates a first set of points may be determined based on the first video data 104(1). Each point of the first set of points may correspond to a location of a body part of the first user 106(1) at a first time. As described with regard to FIGS. 2-4, the location of each point in a set of points may be determined based in part on object recognition and in part on one or more rules that constrain the location of particular points. For example, the determined location of a point representing a user's wrist may be constrained based on the determined location of a point representing a user's elbow. Example methods for determining locations of points based on video data 104 are described with regard to Pavllo et al. and Drover et al., described previously. The first point data 208(1) may represent the first user 106(1) in a particular pose 202. For example, a particular configuration of points may correspond to the user 106(1) being in an upright position, a prone position, a crawling position, a running position, a squatting position, a lunging position, and so forth. If the locations of one or more points within the set of points match those of a particular pose 202 within a threshold tolerance, the locations of the points may indicate that the user 106 is within the corresponding pose 202.

At 508, second point data 208(2) indicating a second set of points may be determined based on the first video data 104(1), each point of the second set corresponding to a location of a body part of the first user 106(1) at a second time. The second point data 208(2) may correspond to the first user 106(1) being in a different pose 202 than the pose 202 represented by the first point data 208(1). For example, the first point data 208(1) may correspond to the first user 106(1) being in a standing, upright pose 202 while the second point data 208(2) corresponds to the first user 106(1) being in a squatting position. In other implementations the first point data 208(1) and second point data 208(2) may correspond to identical or similar poses 202. For example, the first point data 208(1) determined for the first time may correspond to the first user 106(1) beginning a squat exercise in an upright pose 202, while the second point data 208(2) for the second time corresponds to the first user 106(1) completing the squat exercise and returning to the upright pose 202. As described with regard to FIGS. 2-4, in other implementations, other methods of determining the pose 202 of the first user 106(1) may be used in addition to or in place of determining point data 208. For example, the optical flow, pixel color, or other characteristics of pixels may be used to determine locations of body parts of the first user 106(1), which in turn may be used to determine poses 202 achieved by the first user 106(1) at the first time and second time.

At 510, a first performance rate of the activity may be determined for the first video data 104(1) based on the first time and second time associated with the determined point data 208. While FIG. 5 describes determining first and second point data 208 indicating two sets of points associated with two different times, in other implementations, any number of sets of points may be determined at various times and used to determine a performance rate for an activity. For example, each determined point data 208 may represent a set of points that corresponds to a particular pose 202 associated with performance of an exercise or other activity. As another example, each set of points or a portion of the determined sets of points may correspond to completion of a particular activity, such as one repetition of a squat exercise. In other implementations, other characteristics of the first video data 104(1) may also be determined, such as an orientation and viewpoint of the first user 106(1) relative to a camera 110, particular times at which particular poses 202 are achieved by the first user 106(1), a pose 202 of the first user 106(1) associated with a particular direction or position within the field of view of the camera 110, such as a highest and lowest pose 202 during a period of time, and so forth.

At 512, third point data 208 indicating a third set of points may be determined based on the second video data 104(2). The third set of points may be within a threshold distance of the first set of points. Each point of the third set may correspond to a location of a body part of the second user 106(2) at a third time. In some implementations, at least a subset of the points in the third set may be within a threshold similarity of the first set of points. For example, at least a subset of the points in the third set may be determined to be in a similar location in three-dimensional space as corresponding points of the first set, based on analysis of the first video data 104(1) and the second video data 104(2). In other implementations, at least a subset of the points in the third set may be determined to be in a similar location in three-dimensional space relative to a particular point of origin, such as a particular location within a frame or field of view, or a particular point of the set of points. As yet another example, at least a subset of the points in the third set may be determined to correspond to a similar pose 202 as the first set of points based on relative locations of the points to one another. For example, the location of a point that represents a user's knees relative to a point that represents a user's foot may be used to determine a pose 202 of the second user 106(2) that is similar to a pose 202 of the first user 106(1) even if the differences in physical distances between the points differ. Continuing the example, if the second user 106(2) is significantly taller than the first user 106(1), points representing the locations of joints in the second user's legs may be spaced farther apart than points representing the locations of joints in the first user's legs at times when both users 106 are positioned in identical or similar poses 202.

At 514, fourth point data 208 indicating a fourth set of points may be determined based on the second video data 104(2). The fourth set of points may be within a threshold distance of the second set of points, and each point of the fourth set may correspond to a location of a body part of the second user 106(2) at a fourth time. For example, the first and third point data 208 may correspond to times when the first user 106(1) and second user 106(2) are in corresponding poses 202, such as an upright position, while the second and fourth point data 208 may correspond to times when the first user 106(1) and second user 106(2) are in different complementary poses, such as the lowest point of a squat exercise. Generation of the video output 102(2) may include providing video output 102(2) in which the second user 106(2) is in a pose 202 that corresponds to the pose 202 of the first user 106(1). As described previously, other methods of determining the poses 202 achieved by the second user 106(2), such as by using the optical flow, pixel colors, or other pixel characteristics to determine the location of body parts of the second user 106(2), may be used in addition to or in place of determining point data 208.

At 516, a second performance rate of the activity may be determined for the second video data 104(2) based on the third time and the fourth time associated with the third and fourth point data 208. For example, a second user 106(2) presented in the second video data 104(2) may have a rate of movement or may perform an activity at a different rate when compared to the first user 106(1). A relationship between the performance rate for the first video data 104(1) and the performance rate for the second video data 104(2) may be used to generate video output 102(2), based on the second video data 104(2), that has a performance rate that is within a threshold value of the performance rate for the first video data 104(1). As described previously, in some implementations the video output 102(2) may also be provided with a viewpoint that is within a threshold value of the viewpoint determined for the first video data 104(1), such as the distance and orientation of the first user 106(1) relative to a camera 110. Based on the poses 202 represented by the point data 208 determined from the first video data 104(1) and second video data 104(2), the video output 102(2) may present a visual representation 412 of the second user 106(2) that achieves particular poses 202 within a threshold time of times that the first user 106(1) or a visual representation 412 of the first user 106(1) achieves corresponding poses 202.

At 518, video output 102(2) that is synchronized with the first video data 104(1) may be generated using the second video data 104(2). The video output 102(2) may include a visual representation 412 of the second user 102(2) that performs the activity within a threshold value of the first performance rate. For example, the video output 102(2) may depict a visual representation 412 that performs the activity by achieving poses 202 similar to those achieved by the second user 106(2) in the second video data 104(2), but at times that correspond to achievement of corresponding poses 202 by the first user 106(1), while performing the activity at a rate that is similar to the performance rate of the first user 106(1). As described previously, in some implementations, the viewpoint or orientation of video output 102(2) may be synchronized so that the viewpoint presented in the video output 102(2) is within a threshold of the viewpoint of the first user 106(1) relative to a camera. In other cases, the viewpoint of the video output 102(2) may be synchronized to match a selected orientation, such as a viewpoint selected by the first user 106(1) or a default viewpoint. In some implementations, the video output 102(2) may also include a rating, grade, or other data indicative of one or more characteristics for performance of the activity by the first user 106(1). For example, based on the poses 202 achieved by the first user 106(1), the location of one or more points determined based on the first video data 104(1), the performance rate for the first video data 104(1), and so forth, data regarding different metrics may be determined. Continuing the example, the video output 102(2) may be provided with an indication of a range of motion indicating the highest or lowest position achieved by the user 106(1), an indication of the count of repetitions of an activity performed by the user 106(1), an indication of the user's stability or rate of movement, and so forth. In some implementations, correspondence may be determined between the location of one or more points of the first point data 208(1) determined from the first video data 104(1) and an erroneous pose 202 indicative of an error by the first user 106(1), such as a position of one or more body parts that may result in injury or a suboptimal benefit of the activity. In such a case, the video output 102(2) may include an indication of one or more errors performed by the user 106(1) and in some cases, may include corrective instruction associated with the error(s).

Figure 6:
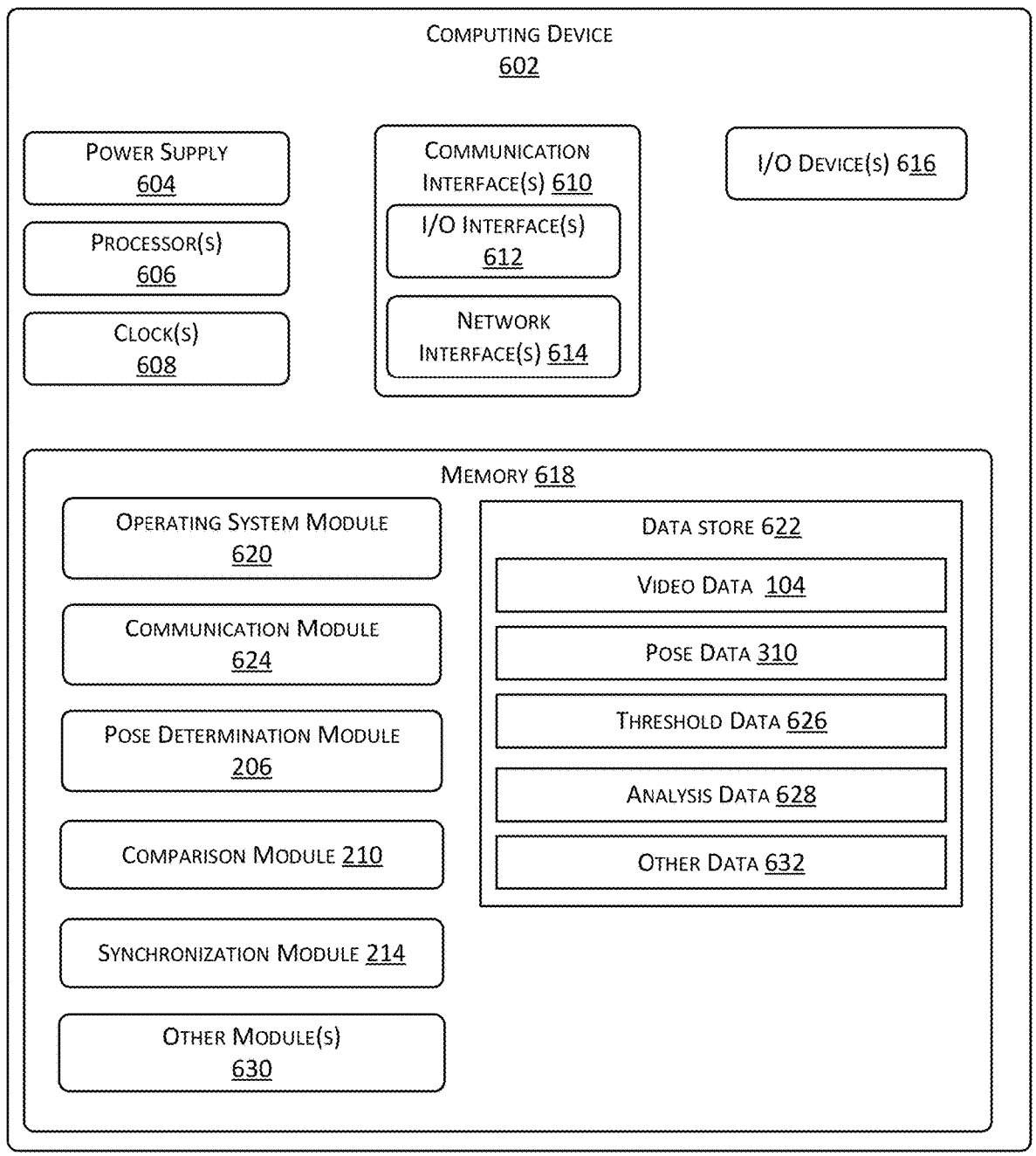
FIG. 6 is a block diagram depicting an implementation of a computing device within the present disclosure.

FIG. 6 is a block diagram 600 illustrating an implementation of a computing device 602 within the present disclosure. The computing device 602 may include a server 112, a user device 108, or any other computing device 602 in communication with a server 112 or user device 108. Additionally, while FIG. 6 depicts a single block diagram 600 of a computing device 602, any number and any type of computing devices 602 may be used to perform the functions described herein. For example, one or more servers 112 and one or more user devices 108 that communicate using one or more networks may be used in combination to determine video data 104 and generate video output 102. In other implementations, a single user device 108 may be used to receive video data 104 and generate video output 102 based on the video data 104.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth. Continuing the example, data from a clock 608 may be used to determine performance rates of activities by users 106 depicted in video data 104 and to generate video output 102 that represents a selected performance rate.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 616 may be physically incorporated with the computing device 602. In other implementations, I/O devices 616 may be externally placed. I/O devices 616 may also include one or more sensors, that may be in direct or wireless communication with the computing device 602. Various types of sensors may be used, and sensors may be associated with various objects including the computing device 602, an object worn by a user 106, or an object within an environment with the computing device 602 or user 106.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the pose determination module 206. The pose determination module 206 may determine one or more poses 202 represented by one or more frames of video data 104. In some implementations, the pose determination module 206 may determine a portion of a frame of video data 104 that represents a user 106 and may remove or disregard other portions of the frame that correspond to a background or other objects. Additionally, in some implementations, the pose determination module 206 may determine point data 208 indicating a set of points that represent locations of body parts of the user 106. Based on correspondence between the point locations 312 of at least a subset of the points, and pose data 310 that associates point locations 312 with pose identifiers 314, particular poses 202 represented by particular frames of video data 104 may be determined. Determining correspondence between the pose data 310 and the locations of points determined from the video data 104 may include determining points from the video data 104 that are within a threshold distance of the point locations 312 indicated in the pose data 310. Threshold data 626 may indicate one or more threshold distances for at least a subset of the points, an aggregate threshold distance, an average threshold distance, and so forth. Corresponding poses 202 that are determined from different sources of video data 104 may be used to generate video output 102, such as by causing the video output 102 to present a visual representation 412 that achieves a particular pose 202 within a threshold length of time from a time that a user 106 achieves a corresponding pose 202. In other implementations, other pixel characteristics, such as motion, color, and so forth may be used to determine the locations of body parts of a user 106 in addition to or in place of determining point data 208.

The memory 618 may additionally store the comparison module 210. The comparison module 210 may determine particular frames from different video data 104 that are associated with corresponding poses 202. In some implementations, the comparison module 210 may determine portions of video data 104 that present corresponding poses 202 based on a pose determination 316, which may be generated based on correspondence between point locations 312 for a frame of video data 104 and the pose data 310. In other implementations, the comparison module 210 may determine point data 208 indicating sets of points for first video data 104(1) that are within a threshold distance of sets of points for second video data 104(2) to determine portions of the video data 104 that are associated with corresponding poses 202. Analysis data 628 may indicate one or more rules or algorithms for such a determination, such as by indicating a weight value associated with one or more points, particular threshold values associated with one or more points, and so forth. For example, a first pose 202 may be determined based on a relationship between the locations (e.g., distances and directions) of various points within a set relative to one another. Continuing the example, a second pose 202 may be determined based on a location of a subset of the points relative to an edge of a field of view or a particular reference point.

The memory 618 may also store the synchronization module 214. The synchronization module 214 may generate video output 102 based on video data 104. For example, first video data 104(1) depicting a first user 106(1) performing an activity within the field of view of a camera 110 may be used to determine a viewpoint, such as a distance and orientation of the user 106(1) relative to the camera 110, one or more poses 202 achieved by the user 106(1), and times that the poses 202 are achieved. The times that particular poses 202 are achieved may be used to determine a performance rate for the activity associated with the first video data 104(1). Second video data 104(2) depicting a second user 106(2) performing the activity may be analyzed to determine times when the second user 106(2) achieves poses 202 that correspond to the poses 202 determined from the first video data 104(1), and in some implementations, a performance rate associated with the second video data 104(2) based on the times associated with the poses 202. The synchronization module 214 may generate video output 102 that includes a visual representation 412 of the second user 106(2). The visual representation 412 may include recorded content that presents a human user 106(2), or a simulated user 106, such as an avatar. The video output 102 may be presented using a viewpoint that is within a threshold value of the viewpoint of the first video data 104(1). The video output 102 may present the visual representation 412 performing the activity at a performance rate within a threshold value of the performance rate determined from the first video data 104(1). The video output 102 may present the visual representation achieving particular poses 202 at or within a threshold value of times that the first user 106(1) achieves corresponding poses 202. In some implementations, the synchronization module 214 may include a visual representation 412 of the first user 106(1), determined from the first video data 104(1), in the video output 102.

Other modules 630 may also be present in the memory 618. For example, user interface modules may be used to generate a user interface for selection of video data 104, receipt and modification of threshold data 626 or analysis data 628, user selection of settings and configurations, and so forth. Other modules 630 may also include encryption modules to encrypt and decrypt communications between computing devices 602, authentication modules to authenticate communications sent or received by computing devices 602, a permission module to assign, determine, and manage user permissions to access or modify data associated with computing devices 602, and so forth. For example, a user permission may include a permission to allow video data 104 that depicts a user 106 performing an activity to be used for generation of video output 102 presented to other users 106.

Other modules 630 may also include an authorization module to enable a user 106 to permit collection of video data 104, data from sensors associated with a user 106, or other data associated with the user 106. For example, if a user 106 does not provide authorization for collection of certain types of data, use of certain types of cameras 110 or other sensors, such as sensors that determine physiological data regarding the user 106, may be prevented. In some cases, a user 106 may authorize use of particular types data for generation of video output 102, but may decline to permit use of the data to identify the user 106 or to be provided to other parties.

Other modules 630 may additionally include an audio module that may select audio output based on the video data 104 that depicts the user 106 performing an activity. For example, based on the performance rate of the user 106, audio output, such as music, may be selected having an audio tempo that corresponds to the performance rate. Continuing the example, music having a faster tempo may be selected for output when the user 106 performs an activity that includes rapid movement, such as cardiovascular exercise, while music having a lower tempo may be selected when the user 106 performs an activity that includes slower movement, such as stretching. In some implementations, an audio module may determine the audio tempo of various audio files in response to the determined performance rate of the user 106, then determine a corresponding audio output to be provided. In other implementations, the audio module may determine correspondence between the performance rate and audio data that associates performance rates or audio tempos with corresponding audio files to be output. Correspondence between the performance rate and the audio data may be used to determine audio output that corresponds to the performance rate.

Other data 632 within the data store(s) 622 may include configurations, settings, preferences, and default values associated with computing devices 602. Other data 632 may also include encryption keys and schema, access credentials, and so forth. Other data 632 may include user interface data for generation of user interfaces presented on a user device 108. Other data 632 may also include network data indicative of networks accessible to one or more computing devices 602. Other data 632 may additionally include audio files for output and in some implementations, audio data that associates performance rates or audio tempos with corresponding audio files to be output, as described previously.

In different implementations, different computing devices 602 may have different capabilities or capacities. For example, servers 112 may have greater processing capabilities or data storage capacity than user devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access first video data representing a first user performing a first activity;
determine, based on the first video data, a first pose of the first user at a first time and a second pose of the first user at a second time;
access second video data that represents one or more of the first user or a second user performing one or more of the first activity or a second activity;
determine a first rate of performance of the first activity based on the first pose and the second pose; and
generate video output based at least in part on the first rate of performance and the second video data, wherein the video output is associated with a second rate of performance of the first activity that is within a first threshold value of the first rate of performance.

2. The system of claim 1, further comprising computer-executable instructions to:
determine, based on the first video data, a third pose of the first user at a third time;
determine that the third pose corresponds to one or more of an erroneous pose or a pose of the first user that deviates from a previous pose of the first user by at least a second threshold store at least a portion of the first video data that corresponds to the third time; and
present the at least a portion of the first video data using a display.

3. The system of claim 1, further comprising computer-executable instructions to:
generate a visual representation of the first user based at least in part on the first video data; and
include the visual representation in the video output.

4. A method comprising:
accessing first video data depicting a first user performing an activity;
determining, based on the first video data:
a first set of points representing a first pose of the first user at a first time, and
a second set of points representing a second pose of the first user at a second time;
determining a first performance rate of the activity by the first user based on a first difference between the first time and the second time;
accessing second video data depicting a second user performing the activity;
determining, based on the second video data:
a third set of points representing a third pose of the second user at a third time, and
a fourth set of points representing a fourth pose of the second user at a fourth time;
determining a second performance rate of the activity by the second user based on a second difference between the third time and the fourth time; and
based on the first performance rate and the second performance rate, generating video output that presents a visual representation of the second user performing the activity at a third performance rate that is within a first threshold value of the first performance rate.

5. The method of claim 4, further comprising:
determining that a first relationship between a subset of the third set of points corresponds to a second relationship between a subset of the first set of points; and
determining that a third relationship between a subset of the fourth set of points corresponds to a fourth relationship between a subset of the second set of points;
wherein the second performance rate is determined in response to the first relationship corresponding to the second relationship and in response to the third relationship corresponding to the fourth relationship.

6. The method of claim 4, further comprising:
determining that the first set of points corresponds to one or more of:
an erroneous pose of the first user, or
a pose corresponding to a maximum range of movement of the first user for performance of the activity;
wherein the first performance rate is determined in response to the first set of points corresponding to the one or more of the erroneous pose or the pose corresponding to the maximum range of movement of the first user.

7. The method of claim 4, further comprising:
determining, based on the first video data, an orientation of the first user relative to a camera;
wherein the video output presents the second user within a second threshold value of the orientation relative to a viewpoint that corresponds to the camera.

8. The method of claim 4, further comprising:
generating a visual representation of the first user based on the first video data;
wherein generating the video output includes presenting the visual representation of the first user one or more of:
adjacent to the visual representation of the second user, or superimposed on the visual representation of the second user.

9. The method of claim 4, further comprising:
determining the activity performed by the first user based on the first video data; and
determining that the second video data is associated with performance of the activity;
wherein the second video data is automatically selected for generation of the video output based on the second video data being associated with performance of the activity.

10. The method of claim 4, further comprising:
accessing third video data depicting the first user performing the activity during a first time period that precedes a second time period associated with the first video data;
determining, based on the third video data, a fifth set of points representing a fifth pose of the first user, wherein the fifth pose corresponds to one or more of:
an erroneous pose, or
a pose corresponding to a maximum range of movement of the first user for performance of the activity; and
including, in the video output, a portion of the third video data that depicts the fifth pose.

11. The method of claim 4, further comprising:
determining, based on the first video data, a rate of movement of the first user during performance of the activity;
determining correspondence between the rate of movement and an audio tempo associated with audio data; and
based on the correspondence between the rate of movement and the audio tempo, providing the audio data to an audio output device.

12. The method of claim 4, further comprising:
determining a fifth pose of the first user based on a fifth set of points at a fifth time;
determining that the fifth pose corresponds to one or more of an erroneous pose or a maximum range of movement of the first user for performance of the activity;
based on the fifth pose corresponding to the one or more of the erroneous pose or the maximum range of movement of the first user, storing at least a portion of the first video data that corresponds to the fifth time; and
including an indication of the fifth pose in the video output.

13. A system comprising:
one or more memories storing computer-executable instructions; and
one or more hardware processors to execute the computer-executable instructions to:
access first video data depicting a first user performing an activity;
determine, based on the first video data, a first pose of the first user at a first time;
determine, based on the first video data, a second pose of the first user at a second time;
determine a first performance rate based in part on the first time and the second time;
access second video data depicting one or more of the first user or a second user performing the activity;
determine, based on the second video data, a third pose of the one or more of the first user or the second user at a third time;
determine, based on the second video data, a fourth pose of the one or more of the first user or the second user at a fourth time;
determine a second performance rate based in part on the third time and the fourth time; and
based on the first performance rate and the second performance rate, generate video output that presents a first visual representation of the one or more of the first user or the second user performing the activity within a first threshold value of the first performance rate.

14. The system of claim 13, wherein the first video data depicts the first user performing the activity during a first time period, and the second video data depicts the first user performing the activity during a second time period that precedes the first time period.

15. The system of claim 13, further comprising computer-executable instructions to:
determine the activity performed by the first user based on analysis of the first video data; and
determine that the second video data is associated with performance of the activity;
wherein the second video data is accessed in response to the second video data being associated with performance of the activity.

16. The system of claim 13, further comprising computer-executable instructions to:
determine, based on the first video data, a fifth pose of the first user;
determine that the fifth pose corresponds to one or more of: an erroneous pose or a pose associated with a maximum range of movement of the first user for performance of the activity;
store a portion of the first video data that depicts the first user in the fifth pose; and
include the portion of the first video data in the video output.

17. The system of claim 13, further comprising computer-executable instructions to:
determine, based on the first video data, a first set of points, wherein each point of the first set of points corresponds to a location of one of a first plurality of body parts of the first user at the first time; and
determine, based on the second video data, a second set of points, wherein each point of the second set of points corresponds to a location of one of a second plurality of body parts of the one or more of the first user or the second user at the third time; and
determine that the first pose corresponds to the third pose based on a relationship between a subset of the first set of points corresponding to a relationship between a subset of the second set of points.

18. The system of claim 13, further comprising computer-executable instructions to:
generate a second visual representation of the first user based on the first video data;
include the second visual representation in the video output.

19. The system of claim 13, further comprising computer-executable instructions to:
determine, based on the first performance rate and the second performance rate, an output rate associated with the video output, wherein the video output is presented at the output rate.

20. The system of claim 13, further comprising computer-executable instructions to:
determine, based on the first video data, an orientation of the first user relative to a camera;
generate the first visual representation of the one or more of the first user or the second user based on the second video data; and
present the first visual representation in the video output within a second threshold value of the orientation, relative to a viewpoint that corresponds to the camera.

21. A system comprising:
one or more memories storing computer-executable instructions; and
one or more hardware processors to execute the computer-executable instructions to:
access first video data depicting a first user performing an activity;
determine, based on the first video data, a first pose of the first user at a first time;
determine, based on the first video data, a second pose of the first user at a second time;
determine a first performance rate based in part on the first time and the second time; and
generate video output based on second video data, wherein the video output is associated with a second performance rate within a threshold value of the first performance rate.

22. A system comprising:
one or more memories storing computer-executable instructions; and
one or more hardware processors to execute the computer-executable instructions to:
access first video data depicting a first user performing an activity;
determine, based on the first video data, a first performance rate of the activity;
access second video data depicting a second user performing the activity; and
generate video output based on the second video data, wherein the video output is associated with a second performance rate within a threshold value of the first performance rate.

* * * * *